United States Patent [19]

Huisman et al.

[11] 4,196,258

[45] Apr. 1, 1980

[54] MAGNETIC RECORDING MEDIUM AND METHOD OF MANUFACTURING SAME

[75] Inventors: Hendrikus F. Huisman; Willem J. Cats, both of Oosterhout, Netherlands

[73] Assignee: U.S. Philips Corporation, New York, N.Y.

[21] Appl. No.: 867,163

[22] Filed: Jan. 5, 1978

[30] Foreign Application Priority Data

Jan. 7, 1977 [NL] Netherlands ..................... 7700107

[51] Int. Cl.$^2$ .............................................. G11B 5/78
[52] U.S. Cl. ..................................... 428/447; 106/37; 252/62.51; 252/62.54; 360/134; 427/128; 428/539; 428/900
[58] Field of Search ............... 428/447, 539, 329, 928; 427/127, 128; 252/62.54, 62.56, 62.52, 62.51, 62.55, 62.57–62.64; 360/134; 260/408

[56] References Cited

U.S. PATENT DOCUMENTS

| | | | |
|---|---|---|---|
| 3,996,407 | 12/1976 | Gross et al. | 428/447 |
| 4,007,313 | 2/1977 | Higuchi et al. | 427/131 |

Primary Examiner—Stanley S. Silverman
Attorney, Agent, or Firm—Norman N. Spain

[57] ABSTRACT

The invention relates to a magnetic recording medium, in particular a magnetic tape. It has been found that the addition of a silane compound containing a chlorinated hydrocarbon group, to the coating of a magnetic recording medium considerably improves the mechanical and electromagnetic properties thereof. A particularly suitable silane compound is α-chloropropyltrimethoxy silane.

4 Claims, No Drawings

MAGNETIC RECORDING MEDIUM AND METHOD OF MANUFACTURING SAME

The invention relates to a magnetic recording medium comprising a non-magnetic carrier and a magnetic coating provided thereon which comprises a magnetic pigment dispersed in a binder as well as a silane compound.

Such a recording medium is known from the published Netherlands Pat. application No. 7,416,863. In the known recording medium, an alkoxyaminoalkylsilane and in particular the substance α-aminopropyltriethoxysilane is used as a silane compound.

The use of organofunctional silanes as coupling agents in compositions of synthetic resins and minerals have been known since the early 1970's. For example, in Applied Polymer Symposium No. 19, pp. 75-90 (1972) there is described the reaction mechanism of the silane coupling in synthetic resin-mineral interfaces and in addition many examples are given of silane compounds and the adhesion of a variety of synthetic resins to minerals, for example glass and metal, influenced by said compounds.

This article teaches that trialkoxy silanes which have an aminoalkyl functional group have the best activity. In this connection, attention in particular is directed to table X on page 89 of this article in which data are stated of the adhesion of a styrene-butadiene polymer on glass under the influence of various silanes.

It appears from the table that the compound α-aminopropyltriethoxysilane described in the above-mentioned Netherlands Patent Application belongs to the substances having the best activity.

Contrary to the teaching of the prior art, it has now been found quite surprisingly that silanes having a chlorinated hydrocarbon group rather than an aminoalkyl group have a significantly improved effect on the mechanical and electro-magnetic properties of a magnetic recording medium.

GENERAL DESCRIPTION OF THE INVENTION

The invention relates in particular to a magnetic recording medium of the kind mentioned in the preamble and is characterized in that the silane compound satisfies the formula

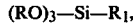

$$(RO)_3-Si-R_1,$$

wherein R is an alkyl group, a cycloalkyl group, an alkoxyalkyl group having each at most 10 carbon atoms, a phenyl group or a benzyl group and $R_1$ is a chloro-alkyl, chlorocycloalkyl or chlorophenylalkyl group of which each alkyl radical contains at most 10 carbon atoms.

Silane compounds of the above formula in which R is an alkyl group having 1-4 carbon atoms and $R_1$ is a chloroalkyl group having 1-6 carbon atoms are preferred. Particularly interesting is the commercially available comparatively cheap α-chloropropyltrimethoxysilane which exerts a very favorable effect on the mechanical and electromagnetic properties of the recording medium.

The use of the above-described silanes in the recording medium according to the invention results in improved mechanical properties, such as increased tensile strength and modulus of elasticity, a reduced abrasive detrition, a better surface as well as a better electromagntic behavior in particular under severe climatological conditions for the recording medium.

The quantity of silane to be employed in the recording medium according to the invention is roughly between 0.2 and 5% by weight calculated on the quantity of magnetic pigment, and is preferably 0.5-2% by weight. It has been found that increase of the content of silane above 2% by weight produces no further significant improvement of the properties of the recording medium. Thus for economy purposes the maximum of 2% by weight is preferred.

The binder used in the magnetic coating of the recording medium according to the invention is of the conventional type. Examples of suitable binders are synthetic resins such as polyvinyl chloride, polyvinyl acetate, which may be partly hydrolysed, polyacrylate, polyesters, polyesteramide, poly-urethane and copolymers of at least two monomers selected from vinyl chloride, vinyl acetate, acrylonitrile, vinyl alcohol, vinyl butyral and vinylidene chloride.

The magnetic pigment in the coating of the recording medium of the invention comprises the usual magnetic particles, such as metal particles of iron, cobalt, chromium and/or nickel, $\alpha Fe_2O_3$ particles, magnetite particles and $CrO_2$ particles. The particles are generally acicular having a length of roughly 0.1-1 μm. The quantity of pigment employed is related to the quantity of binder and is 1-10 parts by weight, preferably 3-6 parts by weight, of the magnetic pigment per part by weight of the binder.

The pigment is finely distributed in the binder by means of a dispersion agent. The usual dispersion agents may be employed, for example, lecithin, in combination with a drying oil, if desired, mono- or diesters of phosphoric acid and alcohols and alkylarylsulphonic acids.

The magnetic coating of the recording medium of the invention may contain, in addition to the above-mentioned ingredients, other conventionally used ancillary substances, for example a lubricant. Lubricants which may be used in the recording medium are, for example, oleic acid, stearic acid, silicone oil, fatty acid amides, petroleum jelly, paraffin, graphite, and reaction products of isocyanates with aliphatic or olefinic alcohols, amines and preferably carboxylic acids of which the aliphatic or olefinic hydrocarbon chain contains 12-24 carbon atoms.

The non-magnetic carrier present in the magnetic recording medium according to the invention usually is in the form of a tape, plate or disk and is preferably manufactured from plastics, such as polyester or polyvinyl chloride. The carrier may also be manufactured from paper, glass or a non-magnetic metal.

The recording medium according to the invention may be manufactured in a usual manner by mixing in a ball mill the ingredients of the magnetic coating, such as binder, magnetic pigment, silane compound, dispersion agent and possibly ancillary substances, such as lubricant, in the presence of an organic solvent and then grinding the resultant mixture and then providing the resultant ground mixture on the carrier.

According to the invention, however, a method of preparing the recording medium is preferably used which is characterized in that the magnetic pigment is first treated with the above-described silane compound, after which the treated pigment together with the binder, a dispersion agent and possible ancillary substances, are mixed and ground in a ball mill in the presence of an organic solvent for the binder and the resulting mixture is then provided on the carrier.

As solvents for the binder there may be used organic liquids, such as esters, for example ethyl acetate, ethers, for example tetrahydrofuran, ketones, for example methylisobutyl ketone and cyclohexanone and chlorinated hydro-carbons, for example, 1,2-dichloroethane.

The treatment of the pigment with the silane compound is carried out in the presence of a suitable diluent, for example a mixture of an alcohol in water.

After thoroughly grinding the dispersion in the ball mill, the larger magnetizable particles, if any, are sieved out and the mixture is provided on the carrier in a uniform layer.

The preferred method according to the invention for preparing the recording medium results in a magnetizable recording medium which, compared with a magnetic recording medium prepared according to the usual method, shows better mechanical properties, such a tensile strength and modulus of elasticity.

As already noted above, the carrier may have the form of a tape, plate or disk and the like and, dependent on the material from which the carrier is manufactured, may possibly be provided with a suitable adhesive layer for the coating to be provided on the carrier. In addition to the adhesive layer, other layers, such as an antistatic layer, may be provided. The whole is then dried, the solvent evaporated and a recording layer having a diameter of 2 to 10µ remaining on the carrier.

In order to promote the resistance to detrition, said layer of the recording medium may be cured and also be subjected to a calendering process in which the surface of the layer becomes smoother.

The invention will be described in greater detail with reference to the ensuing specific examples.

EXAMPLES

1. The following ingerdients were placed in a ball mill:
   96 parts by weight $\alpha$-Fe2O3
   0.96 parts by weight $\alpha$-chloropropyltrimethoxysilane
   3.85 parts by weight of lecithin
   40 parts by weight tetrahydrofuran
   15.5 parts by weight cyclohexanone and
   64.4 parts by weight methylisobutylketone.

The ingredients were mixed for two hours and 52.4 parts by weight of a 20% solution of polyurethane resin in a mixture (1:1) of tetrahydrofuran and cyclohexanone, as well as 69.9 parts by weight of a 30% solution of vinylidene chloride-acrylonitrile copolymer (8:2) in a mixture (1:1) of tetrahydrofuran and cyclohexanone, as well as 33.1 parts by weight of methylisobutylketone were added to the resulting mixture. The whole mixture was ground for several hours until a grinding fineness smaller than 2-3 µm was achieved. The product was drained, filtered and provided on a 12 µm thick foil of polyethylene terephthalate. The assembly of carrier and magnetic coating was dried and calendered, a layer of the magnetic coating of 6 µm thick being ultimately obtained.

2. A magnetic recording medium was prepared in a manner corresponding to that described in Example 1, with the difference, however, that the silane compound was not provided in the ball mill as such but was provided on the magnetic pigment in a pretreatment. For this purpose the $\alpha$-Fe$_2$O$_3$ is stirred for 1 hour with the $\alpha$-chloropropyltrimethoxysilane in a water-alcohol mixture. After this treatment the $\alpha$-Fe$_2$O$_3$ was filtered, dried and added (according to the prescription given in example 1) to the ball mill together with the other ingredients.

3. A recording medium was prepared in the same manner as described in example 1 with the omission, however, of the silane compound. For good order's sake it is noted that magnetic recording medium thus prepared does not belong to the invention but was used as a comparison material in the tests according to the following example.

4. With the magnetic recording media obtained according to the examples 1, 2 and 3 and in particular the magnetic coating thereof, experiments were carried out the results of which are recorded in table I.

Column 1 of table I shows the recording medium by reference to the relevant example for the preparation thereof. Column 2 states for clearness' sake which silane compound has been used. In column 3 the breakage strength of the magnetic coating is shown. For this purpose, the magnetic coating is not provided on a foil of polyethylene terephthalate (as in the examples) but on a non-adhering base, in this case a glass plate. After curing the coating, the base plate is removed and the F-fracture in kg/cm$^2$ of the remaining magnetic coating was then determined. Column 4 shows in kg/cm$^2$ the elastic modulus 1 of these magnetic coatings. The abrasive detrition expressed in mg is shown in column 5. Said detrition is determined according to the standard Tabor-abraision test in which the magnetisable coating is provided on an Al-plate. The Cs 10-wheels used in the Tabor-abraision test, each loaded with 500 g, were rotated 1000 times over the surface of the magnetic coating after which the loss of weight of the magnetic coating was measured.

The results of a life test are recorded in column 6. According to the life test, a 6.3 kHz signal is reocrded on the magnetic tapes manufactured according to the above examples. The tapes are passed along a Sandust reproduction head at a speed of 4.75 cm/sec. at an ambient temperature of 30° C. and a relative humidity of 90%. In column 6 there is stated the number of times which the tape can be passed along the Sandust head without a signal strength loss exceeding 0.5 dB occuring.

TABLE I.

| recording medium according to example | silane compound used | F fracture in kg/cm$^2$ | E-modulus in kg/cm$^2$ | abrasive detrition in mg | life test 30° C., 90% relative humidity |
|---|---|---|---|---|---|
| 1 | $\alpha$-chloropropyltrimethoxysilane | 200 | 22000 | 0.057 | > 100 |
| 2 | $\alpha$-chloropropyltrimethoxysilane | 205 | 25000 | 0.063 | > 100 |
| 3 | None | 100 | 15000 | 0.104 | 30 |

5. The following ingredients were provided in a ball mill:
   231 parts by weight of a 20% solution of a mixture (100:15) of a copolymer vinyl chloride-vinyl acetate-vinyl alcohol (mixing ratio 90-4-6) and of polyester in methylisobutylketone.
   3.9 parts by weight of sodium-lecithin as a dispersion agent
   1.3 parts by weight of oleic acid as a lubricant
   100 parts by weight of $\alpha$-Fe$_2$O$_3$ 1 part by weight of α-chloropropyltrimethoxysilane. The mixture was ground for several hours to a grinding fineness of 2-3 μm. The product was drained, filtered through an asbestos filter and provided on a 12 μm thick foil of polyethylene terephthalate. The assembly of carrier foil and magnetic coating was dried and calendered, the layer thickness of the magnetic coating being reduced to 6 mm.

6. In an analogous manner as described in Example 5 a magnetic recording medium was manufactured in which the silane compound was not provided as such in the ball mill but was provided on the α-Fe₂O₃ in a pretreatment according to example 2. The thus pretreated α-Fe₂O₃ was provided in the ball mill.

7. In the same manner as described in example 6, a magnetic recording medium was prepared in which the material α-aminopropyltriethoxysilane was used as a silane compound.

8. In the same manner as stated in example 5 a magnetic recording medium was manufactured without a silane compound.

9. The recording media obtained according to examples 5 to 8 were subjected to tests as regards breakage strength, E-modulus and abrasive detrition according to the methods stated in example 4. The results are recorded in the table II below.

TABLE II

| recording medium according to example | silane compound used | F fracture in kg/cm² | E-modulus in kg/cm² | abrasive detrition in mg. |
|---|---|---|---|---|
| 5 | α-chloropropyltrimethoxysilane | 215 | 30,000 | 0.080 |
| 6 | α-chloropropyltrimethoxysilane | 215 | 32,000 | 0.076 |
| 7 | α-aminopropyltriethoxysilane | 90 | 15,000 | 0.110 |
| 8 | None | 25 | 8,500 | 0.135 |

I claim:

1. A magnetic recording medium comprising a carrier and a magnetizable coating provided thereon said coating comprising a magnetic pigment dispersed in a binder and a silane compound, said silane compound having the formula $$(RO)_3-Si-R_1$$

where R is alkyl, cycloalkyl, alkoxy alkyl each of at most 10 carbon atoms, phenyl or benzyl and $R_1$ is chloroalkyl, chlorocycloalkyl or chlorophenylalkyl of which each alkyl radical contains at most 10 carbon atoms.

2. A magnetic recording medium of claim 1, wherein the silane compound has the formula $$(R_2O)_3-Si-R_3,$$

where $R_2$ is alkyl of 1-4 carbon atoms and $R_3$ is chloroalkyl of 1-6 carbon atoms.

3. A magnetic recording medium of claim 2 wherein the silane compound is a α-chloropropyltrimethoxysilane.

4. A magnetic recording medium of claim 1, wherein the magnetic recording medium contains 0.5-2% by weight of the silane compound calculated on the quantity of magnetic pigment.

* * * * *